INVENTORS:
ROBERT W. JENNY
EDWARD I. FISHER

ATTORNEYS.

Dec. 11, 1962   R. W. JENNY ET AL   3,067,724
FASTENER-APPLYING MACHINE
Filed Nov. 8, 1957   5 Sheets-Sheet 3

INVENTORS:
ROBERT W. JENNY
EDWARD I. FISHER
BY
ATTORNEYS.

INVENTORS:
ROBERT W. JENNY
EDWARD I. FISHER

ATTORNEYS.

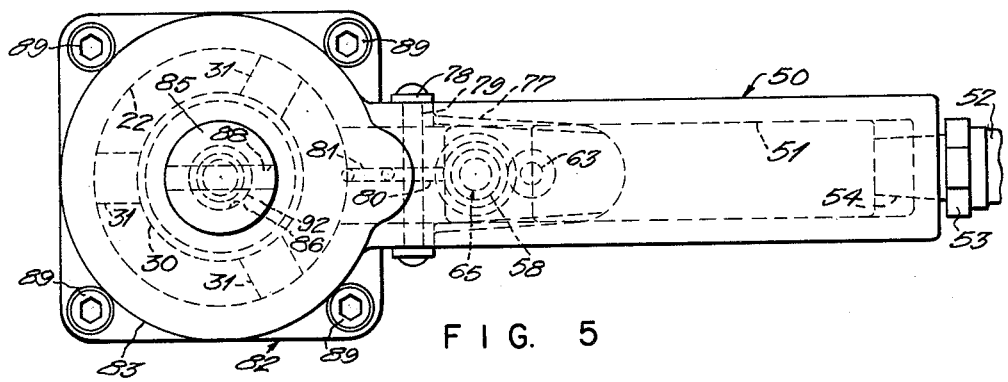
FIG. 5
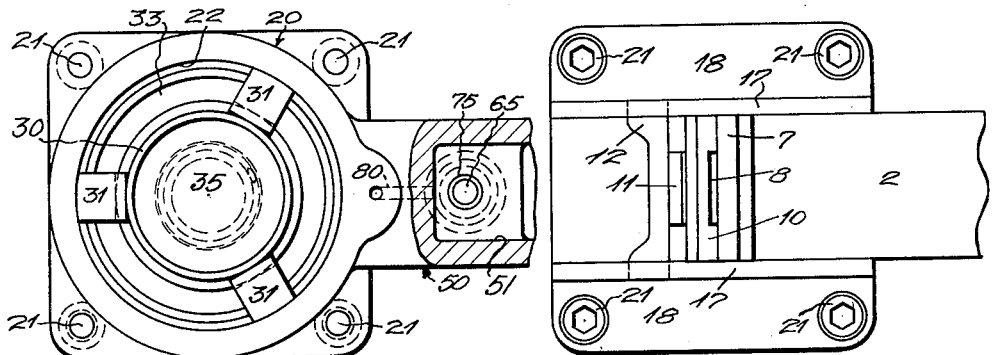
FIG. 6
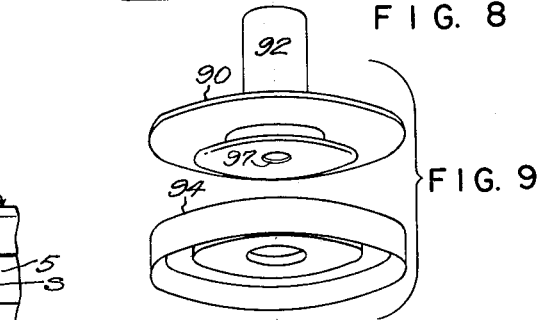
FIG. 8
FIG. 9
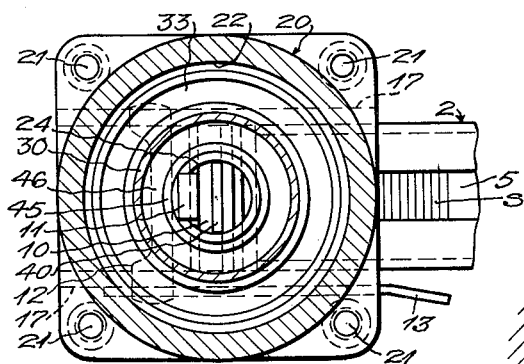
FIG. 7
FIG. 10
INVENTORS:
ROBERT W. JENNY
EDWARD I. FISHER
BY
ATTORNEYS.

United States Patent Office 3,067,724
Patented Dec. 11, 1962

3,067,724
FASTENER-APPLYING MACHINE
Robert W. Jenny, Bellevue, Wash., and Edward I. Fisher, Westerly, R.I., assignors to Bostitch, Inc., East Greenwich, R.I., a corporation of Rhode Island
Filed Nov. 8, 1957, Ser. No. 695,412
2 Claims. (Cl. 121—21)

This invention relates to fastener-driving machines or appliances and more particularly to a portable fluid-pressure operated implement for fastening together various objects and articles; for example, covers to wooden boxes and cases, tacking or nailing sheathing to the walls of buildings, and for attaching numerous other articles and objects.

One object of the invention is to provide a relatively light-weight compact implement that may be held conveniently in one hand and manipulated for operation to apply fasteners, such as U-shaped wire staples, to the parts to be attached.

Another object is to provide an implement of the type indicated for driving staples having relatively long legs completely embedded throughout their length in the material of the part to be fastened with the head or crossbar countersunk in the material flush with the surface thereof.

A particular object of the invention is to provide in a machine of the type indicated embodying a reciprocable piston connected to staple-driving means and fluid-pressure, either pneumatic or hydraulic, for actuating said piston under maximum power throughout the complete stroke of said piston.

Another object is to provide a constant supply of high pressure fluid for the piston including a semi-automatic diaphragm-valve for controlling the application of pressure to the piston.

Another object is to provide a device of the type indicated having a main pressure-chamber of large cavity for air or other fluid fed thereto from a supply line and a smaller chamber separated therefrom by the diaphragm-valve, with manually-operable means for controlling the application of the pressure to the piston.

A further object of the invention is to provide manually-operable valve means for normally admitting air to said smaller chamber for operating the automatic valve diaphragm and for reversing said manually-actuated valve to apply full pressure to the piston for actuating the fastener-driving means.

Further objects and advantages of the present invention are set forth in the following specification or will be obvious to persons skilled in the art; it being understood that the present disclosure is by way of example only, to illustrate a preferred embodiment of the invention as shown by the accompanying drawings.

In the drawings:

FIG. 5 is a top plan view of the complete machine;

FIG. 6 is a top view of the hollow column or standard surmounting the forward end of the magazine of the machine and showing the inner cylinder with the means for mounting it concentrically within the bore of the column;

FIG. 7 is a similar view in section taken in a plane on line 7—7 of FIG. 1;

FIG. 8 is a bottom plan view of the forward end of the magazine showing the mounting for the standard or column;

FIG. 9 is a composite perspective view of the diaphragm-valve at the upper end of the cylinder within the terior of the column; and FIG. 10 is a cross-sectional view of the stem of the poppet valve taken on line 10—10 of FIG. 2 and showing the air-passages through the tubular bearing in which the stem is slidably mounted.

Figure 1:
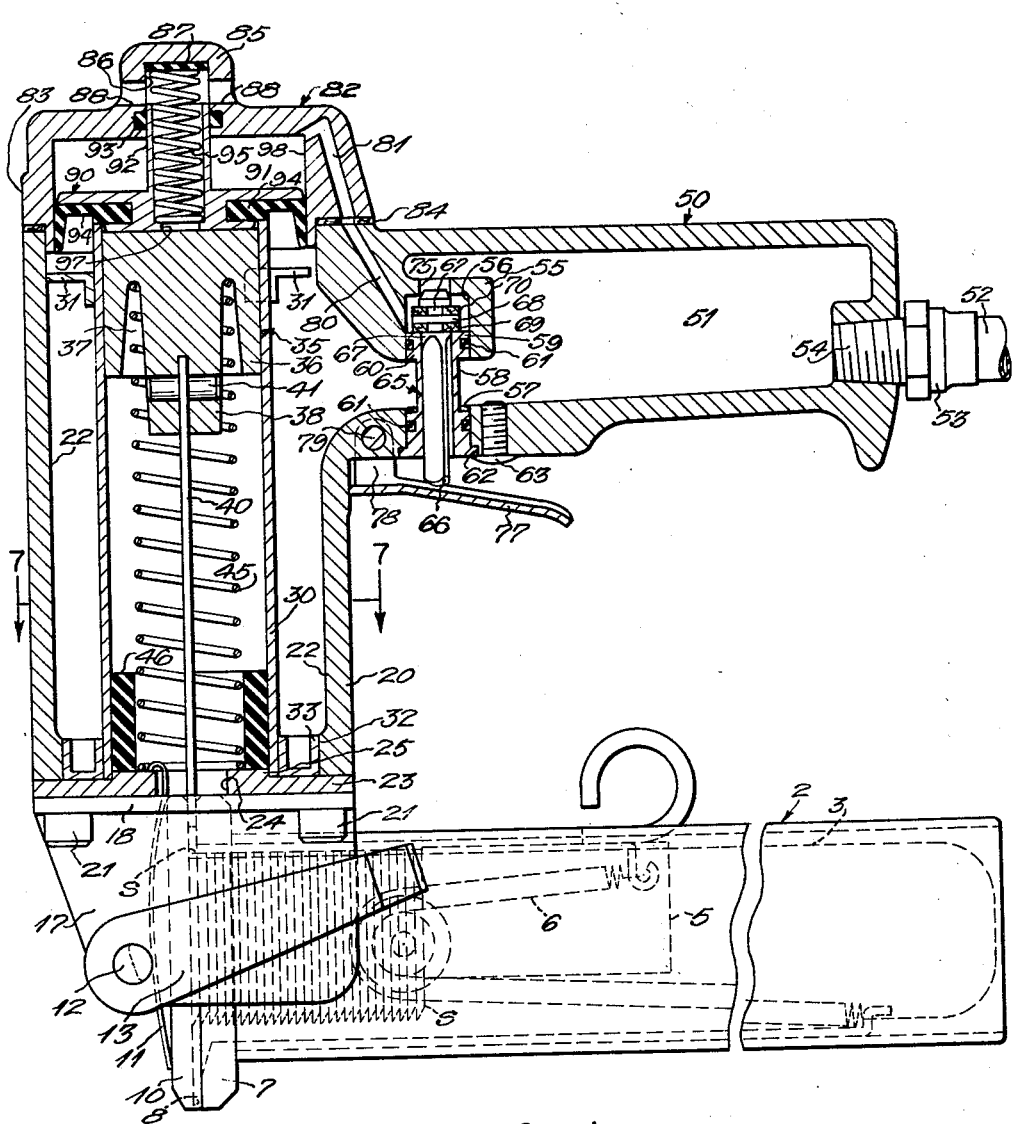
FIG. 1 is a side elevational view of the complete implement showing the power-operated unit in longitudinal section taken in a vertical plane intersecting the axis of the pressure cylinder and piston.

In general, the present improved fastener-applying implement or machine is similar to that described in United States Letters Patent No. 2,857,596 dated October 28, 1958. As herein illustrated the machine comprises a longitudinally-extending hollow magazine for fasteners in the form of U-shaped staples, the forward end of the magazine being surmounted by a column or hollow casing providing a chamber for fluid-pressure. Within the casing is a cylinder having a pressure-operated piston slidably mounted to reciprocate therein for actuating a fastener-driver connected thereto. The magazine 2 of the present machine may be of any desired form and construction and as herein illustrated it is of the rear loading type substantially identical with that in the aforementioned patent application. It may be constructed of sheet-metal in conventional U-shape with an inner core 3 extending lengthwise of its interior for mounting U-shaped staples s straddled thereacross to be fed forwardly into a throat or raceway by means of a pusher 5 under the impulse of a spring 6, all as usually arranged.

The forward end of the magazine 2 is constructed with a nosepiece 7, so-called, slotted to form a throat 8 for receiving the staples s and provide a raceway through which they are driven in applying them to the work. The front of the throat 8 is closed by a removable door 10 held in place by a bow-shaped spring 11 with a cam-shaped rod 12 rotatably mounted at the front of the door and having a lever 13 at one end for manually rocking it to compress the spring and bind the door against the nosepiece 7.

The forward end of the magazine 2 has fastened to its opposite sides, by welding or otherwise, a pair of sheet-metal plates 17 (FIGS. 1 and 8) formed at the top with right-angular flanges 18 which serve as a rest and support for a column 20 that provides a casing for the operating parts of the machine. The column 20 may be constructed as a casting, or otherwise, with its base fastened to the lateral flanges 18 on the plates 17 by screws 21, or by other means such as welding. The column 20 may be cylindrical in cross-section with an axial bore 22 cored out on its interior to form a relatively large cavity constituting a chamber for pressure-fluid.

The base of the column 20 is of rectangular configuration (FIG. 7) conforming to the shape of the opposite flanges 18 on the side plates 17. A plate 23 of the same configuration underlies the base of the column 20 above the flanges 18 with the threaded shanks of the screws 21 extending through holes therein at the corners of the plate and base and screwed into the base (FIGS. 1 and 7). The base plate 23 has a central hole 24 with a circular boss 25 surrounding it at the top to provide a mounting for a cylinder 30.

The cylinder 30 may be constructed with a relatively thin wall having its bottom rim fitting around the edge of the boss 25 on the plate 23 to hold it from lateral displacement and adjacent its upper end are a plurality of lugs 31 projecting radially therefrom (FIG. 6) in engagement with the inner wall of the bore 22 in the column 20 to brace the cylinder at the top. The lugs 31 may be formed of sheet-metal folded into angular shape to provide depending portions which are brazed, welded or otherwise fastened to the periphery of the cylinder 30.

Seated on the plate 23 and surrounding the bottom of the cylinder 20 with its outer circumference abutting a finished face 32 in the bore 22 of the column 20 is a flexible gasket 33 of U-shape in cross-section (FIG. 1) which forms a seal for the joint between the plate 23 and base of the column 20 and also the joint with the inner wall of the cylinder 30.

Slidable within the cylinder 20 is a piston 35 which may be of substantially solid formation with a cylindrical skirt 36 and an annular groove 37 surrounding a tapered central portion 38 that is slotted vertically to receive the upper end of a staple-driver 40. The lower end of the driver 40 is thus mounted to slide in the throat or raceway 8, a pin 41 inserted through a transverse hole in the central portion 38 of the piston 35 and a hole in the driver-blade 40 being used to fasten the driver to the piston.

A helical spring 45 having its lower end seated on the plate 23 extends upwardly in the cylinder 35 with its upper end received in the groove 37 surrounding the central portion 38 of the piston 35. Also seated on top of the base plate 23 within the cylinder 30 is a bumper of shock-absorber in the form of a ring or annular 46 constructed of rubber of other resilient material for cushioning the impact of the piston 35 at the end of its downward stroke.

Projecting laterally from the side of the standard or casing 20 is a horizontal handle-member 50 disposed in parallel relation to the magazine 2 at a distance thereabove. The handle 50 is cored out to provide a chamber 51 which may be supplied with pressure-fluid from a hose 52 connected to its rearward end by a coupling 53 having a threaded nipple 54 screwed into a hole therein. The forward end of the chamber 51 in the handle 50 is formed with a housing 55 for a manually-operable poppet valve which controls the admission of air into the upper end of the main pressure-chamber formed by the bore 22 in the column 20. The housing 55 is formed with a bore 56 concentric with a similar bore 57 in the lower wall of the handle 50. Held in the bores 56 and 57 is a tubular bearing member 58 in the nature of a bushing having annular enlargements 59 and 60 at its ends with gaskets 61 held in peripheral grooves therein to seal the joints between the bushing and said bores. The lower portion 60 of the bushing 58 is flanged outwardly at its end to seat in a counterbore 62. A screw 63 threaded through the under side of the handle 50 has its head engaging the bottom of the bushing 58 to retain the latter in its bearings. Slidebly mounted in the axial bore of the bearing member 58 is the poppet 65 which is of novel construction as next described.

Figure 3:
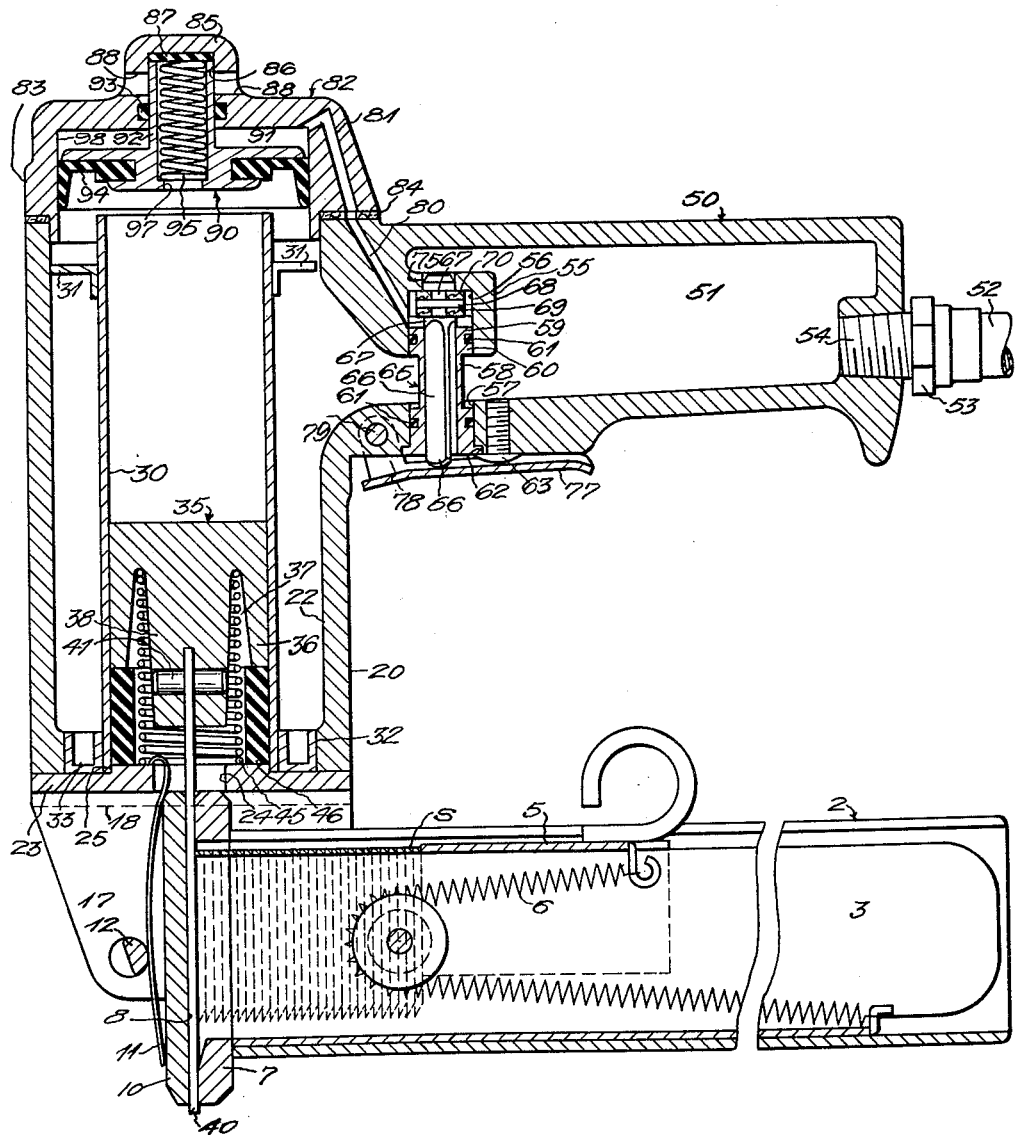
FIG. 3 is a view similar to FIG. 2 showing the manually-operable control valve open with the piston at the end of its descent for driving a fastener.

The poppet 65 consists in a cylindrical stem 66 slidably mounted in the bore of the bushing 58 and having its upper portion 67 of reduced diameter with an annular disk-like enlargement 68 projecting radially therefrom. Surrounding the reduced upper portion 67 of the stem 66 in abutting relation to the opposite faces of the disk 68 are annular washers 69 and 70 of compressible material disposed in the upper portion of the bore 56 and adapted to engage respectively with the end of the bushing 58, and alternately with the upper end of the bore 56. The upper end of the stem 66 of the poppet 65 is adapted to engage through a hole 75 in the housing 55 that forms a port for admitting air from the chamber 51 down into the bore 56. The bore 56 communicates with the upper end of the chamber 22 in the column 20 by means of a duct 80 later described. The upper end of the stem 66 is beveled around its rim to pass the air through the port 75 when the poppet 65 is in its normal depressed relationship (FIG. 1). The stem 66 of the poppet 65 is flatted on its sides throughout the greater portion of its length (FIGS. 3 and 10) to provide a passageway through the bushing 58 when the poppet is raised to close the port 75 as shown in FIG. 3. At this juncture air may escape from the upper end of the bore 22 in the standard 20 through the valve to exhaust down through the bushing to the atmosphere as later explained. The poppet 65 is operated manually by means of a trigger 77 having ears 78 pivoted on a transverse pin 79 extending through the under side of the handle 50. Normally, the trigger 77 swings downwardly under the force of gravity with its inner end engaging against the side of the standard 20 (FIG. 1) to limit its motion in this direction.

Leading upwardly from the bore 56 in the housing 55 is the duct 80 which communicates with a continuing duct 81 in a cover 82 closing the upper end of the bore 22 in the standard or casing 20. The cover 82 is substantially cup-shaped having its rim 83 engaging the upper rim of the column 20 with a gasket 84 inserted in the joint therebetween. The top of the cap or cover 82 is formed with a projecting boss 85 and an axial bore 86 containing a washer 87 seated in the end thereof. Extending transversely through the boss 85 is a hole 88 which provides opposite ports for egress of the air from the bore 86 to the atmosphere. The cover 82 is fastened to the top of the column 20 by means of screws 89 (FIG. 5).

The automatically operated diaphragm-valve, previously mentioned, comprises a disk-like closure 90 formed with an upstanding hollow stem 92 slidable in the axial bore 86 of the cap 82. A gasket 93 held in a groove surrounding the bore 86 seals the joint between the stem 92 and bore. Held in an annular groove in an enlargement on the under side of the valve-disk 90 is a flexible washer 94 (FIG. 9) of substantially saucer-shape disposed with its downwardly projecting circumferential flange slidably engaging the interior of the bore 98 in the cap or cover 82. The diaphragm 90 thus acts to form an auxiliary pressure-chamber 91 at the top of the chamber 22.

Housed within the hollow stem 92 of the valve-member 90 is a helical spring 95 arranged with its upper end engaging the washer 87 and its opposite end bearing against shoulders at the lower end of an opening 97 through the stem 92; the tension of said spring tending to force the valve-disk 90 down against the open top of the cylinder 30 to close it as shown in FIG. 1. The construction and arrangement of the machine having now been described in detail, its method of operation for applying staples to the work is as next explained.

The machine is loaded by withdrawing the staple-pusher 5 from the rearward end of the magazine 2 and inserting a supply of staples, usually cemented together in a stick or refill, in straddled relation on the core 3.

The pusher 5 is then replaced with its spring 6 tensioned to feed the staples forwardly and deliver the foremost one into the throat 8. It will be understood that both chambers 51 and 22 are supplied continuously with high pressure fluid, either pneumatic or hydraulic, fed through the hose 52 from a suitable source.

The handle 50 of the machine is grasped in one hand with the forefinger looped under the valve-trigger 77 and the nosepiece 7 pressed against the work. Prior to operation of the machine the parts of the staple-driving mechanism are in the relationship illustrated in FIG. 1 with the valve-poppet 65 depressed by the pressure in the chamber 51 which enters through the port 75 to hold the lower washer 69 seated against the upper end of the bushing 58. The pressure thus entering into the upper end of the bore 56 flows through the ducts 80 and 81 to feed into the restricted auxiliary chamber 91 at the upper end of the bore 22 in the column 20, thereby augmenting the force of the spring 95 to hold the diaphragm 90 pressed down against the upper end of the cylinder 30 and sealed thereto by the washer 94. Pressure is therefore prevented from entering the cylinder 30 to act against the piston 35 which is held at the upper end of the cylinder under the tension of the spring 45. In this connection it should be noted that the top of the diaphragm 90 has a considerably greater area exposed to the pressure in the chamber 91 than the area on its under side exposed to the pressure in the chamber 22 so as to maintain an unbalance for holding the diaphragm closed against the open top of the cylinder 30.

Figure 2:
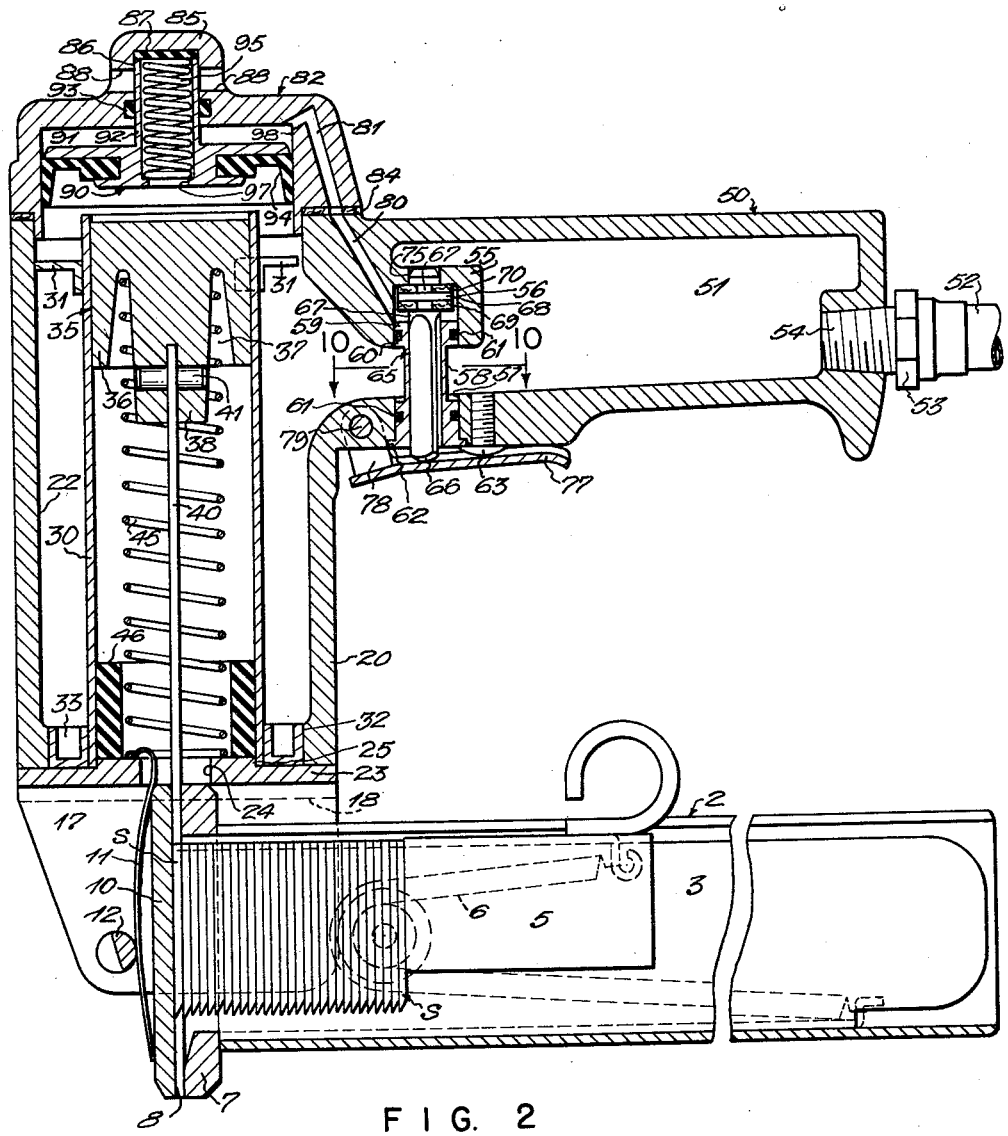
FIG. 2 is a similar sectional view showing the power-applying mechanism with the parts in their relationship at the start of driving a fastener and also illustrating the staple-magazine and its connections in longitudinal section in a vertical plane.

To operate the machine the trigger 77 is drawn upwardly (FIG. 2) to raise the poppet 65 and seat its washer 70 against the upper end of the bore 56 to close the port 75. Raising of the poppet 65 releases its lower washer 69 from the end of the bushing 58 (FIG. 2) to open a passage down through the bore in said bushing as provided by the space around the flat sides of the stem 66 (FIG. 10). By this action the pressure in the auxiliary chamber 91 above the diaphragm 90 escapes down through the ducts 81 and 80 and the bore in the bushing 58 to exhaust into the atmosphere. Release of pressure from the chamber 91 frees the diaphragm 90 to cause the pressure in the chamber 22 to raise it above the top of the cylinder 30 whereby to apply maximum pressure to the piston 35 to slide it downwardly for a staple-driving stroke. As the piston 35 descends the air in the cylinder 30 is exhausted through the opening 24 at its lower end.

As the piston 35 is driven downwardly under maximum pressure and at a rapid rate the driver-blade 40 strikes the top of the staple s in the throat 8 with sufficient impact to separate this staple from the stick and drive it down into the work. It will be observed that the piston 35 is operated under maximum power due to the relatively large supply of high pressure in the two chambers 51 and 22; the pressure being maintained at full force throughout the complete stroke of the piston 35 until it finishes its descent by striking the cushioning buffer 46 (FIG. 3). Thus, by the application of continuous high pressure to the piston 35, staples having extremely long legs can be driven completely into the work, even under considerable resistance thereto by hard materials, with the heads of the staples countersunk into the surface to impart an especially neat and finished appearance to the work.

Figure 4:
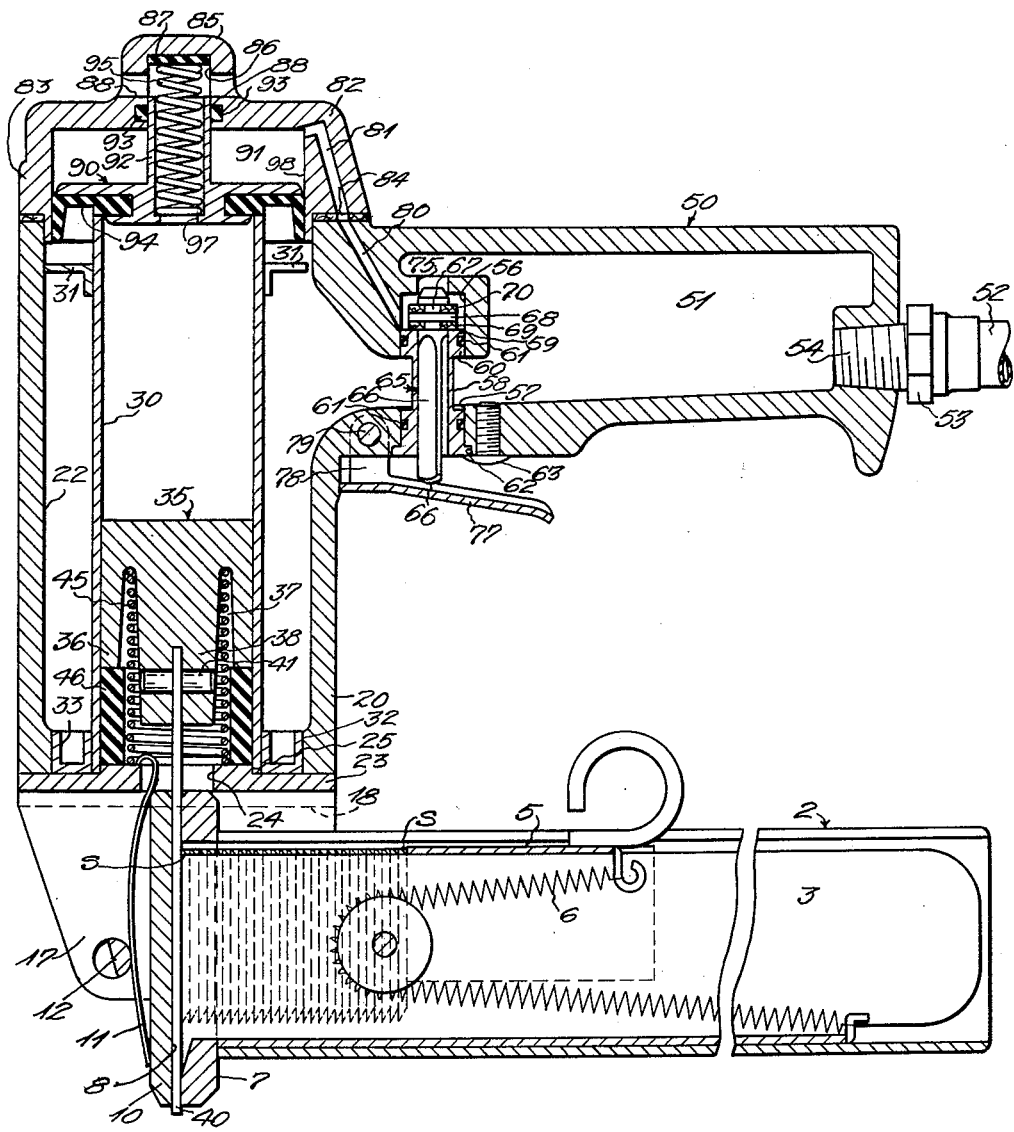
FIG. 4 is a similar view showing the manually-operable valve closed in one direction and the automatic diaphragm-valve seated at the top of the cylinder with the pressure released from the piston for escape to the atmosphere.

Upon completion of driving a staple the trigger 77 is released and the poppet valve 66 will be depressed to open the port 75 for admitting pressure through the passages 80 and 81 into the auxiliary chamber 91, this pressure acting with the spring 95 in the stem 92 of the diaphragm-closure 90 to force the latter down to seal the upper open end of the cylinder 30. Consequently the depression of the diaphragm 90 will withdraw its stem down through the bore 86 in the cover 82 so as to uncover the ports 88 (FIG. 4). The pressure in the cylinder 30 will thus be allowed to escape through the opening 97 in the hollow stem of the diaphragm 90 to exhaust through the ports 88. As this occurs the spring 45 will act to return the piston 35 to the upper end of the cylinder 30. The ascent of the piston 35 withdraws the driver-blade 40 in the throat 8 until its lower end is raised above the top of the staple core 3 in the magazine 2. The machine is thus made ready for another operation to drive the next staple fed into the throat 8. As the piston 35 reaches the upper end of its stroke it brings up against the diaphragm 90.

It will be apparent from the foregoing description in the specification and the illustration of the drawings that the present invention provides an extremely efficient machine or implement for driving staples having long legs into various objects for fastening parts thereto. It will also be obvious that the piston-operating means as herein shown and described may be applied to other uses for actuating elements other than fastener-drivers. In the embodiment herein shown, by way of example, the implement is of light weight and convenient to operate with its novel and ingenious machanism especially simple in form and construction. Various modifications may be made in the structure and arrangement of the parts of the mechanism of the machine without departing from the scope of the appended claims and therefore without limiting ourselves to the exact construction disclosed herein, we claim:

1. In an implement for applying fasteners or the like,
    a casing containing a pressure-chamber,
    means for supplying fluid-pressure to said chamber,
    a cylinder in said chamber,
    said cylinder having an ingress for admitting pressure thereto.
    a piston reciprocable in said cylinder,
    fastener-driving means connected to said piston for actuation thereby,
    a diaphragm-closure movable in said pressure-chamber for sealing the ingress to said cylinder,
    a bore in the casing above said closure,
    a hollow stem on said closure slidable thereby in said bore,
    an exhaust port leading from said bore to the atmosphere,
    a second bore in said casing,
    a poppet valve slidable in said second bore,
    an inlet port leading from said pressure-chamber into said second bore,
    a duct leading from said second bore and opening into the pressure-chamber above said closure,
    an exhaust port in said second bore,
    and means for operating said poppet valve to close the port opening from said pressure-chamber into said second bore and opening the exhaust port in said second bore to the atmosphere.

2. A fastener-applying implement comprising a casing having a main pressure-chamber at one end,
    an auxiliary chamber for supplying pressure fluid to said main chamber,
    a cylinder mounted in said main chamber with its upper open end spaced from the closed end of said chamber,
    a diaphragm-closure slidable in said main chamber for sealing the open end of said cylinder,
    a bore in the casing above said closure,
    a hollow stem on said closure slidable thereby in said bore,
    a spring for normally sliding said closure in said main chamber to close the open end of said cylinder,
    an exhaust port leading from said bore in the closed end of said chamber for escape of pressure from said cylinder,
    a piston slidable in said cylinder,
    a fastener-driver connected to said piston for actuation thereby,
    a housing in said auxiliary chamber, a bore in said housing,
a poppet valve slidable in the bore in said housing,
an inlet port in said housing for admitting pressure from the auxiliary chamber into the bore in said housing,
a duct leading from the bore in said housing and opening into the upper end of the main chamber above said closure,
an exhaust port leading from the bore in said housing to the atmosphere,
said poppet valve having means for closing the inlet port leading from the auxiliary chamber into the bore of said housing and opening the exhaust port leading from the bore in said housing to the atmosphere to exhaust the pressure from the upper end of the main chamber,
and manually-operable means for sliding said poppet.

References Cited in the file of this patent

UNITED STATES PATENTS

| | | |
|---|---|---|
| 2,306,666 | Sauter | Dec. 1, 1942 |
| 2,671,214 | Juilfs | Mar. 9, 1954 |
| 2,677,933 | Hopkinson | May 11, 1954 |
| 2,713,165 | Campbell et al. | July 11, 1955 |
| 2,854,953 | Osborne | Oct. 7, 1958 |
| 2,944,522 | Doyle | July 12, 1960 |
| 2,960,067 | Osborne | Nov. 15, 1960 |